Figure 10:
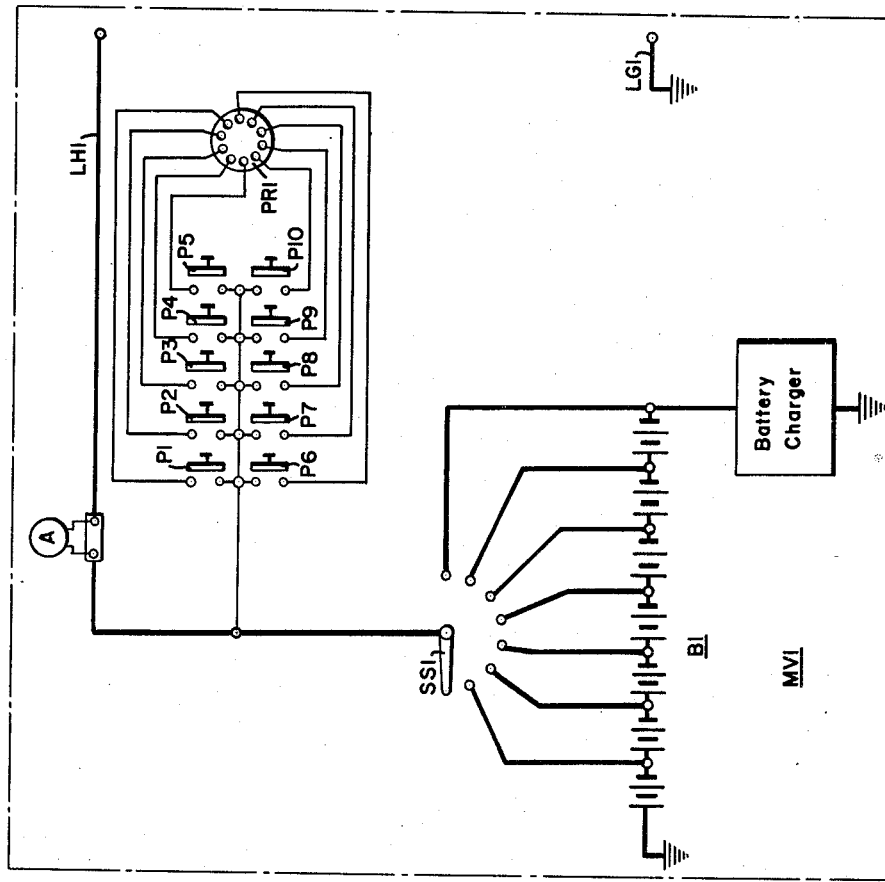

March 19, 1957   D. C. FINNEY ET AL   2,786,168
METHOD AND APPARATUS FOR PRESERVING MOTOR VEHICLES
Filed Feb. 23, 1954   4 Sheets-Sheet 1
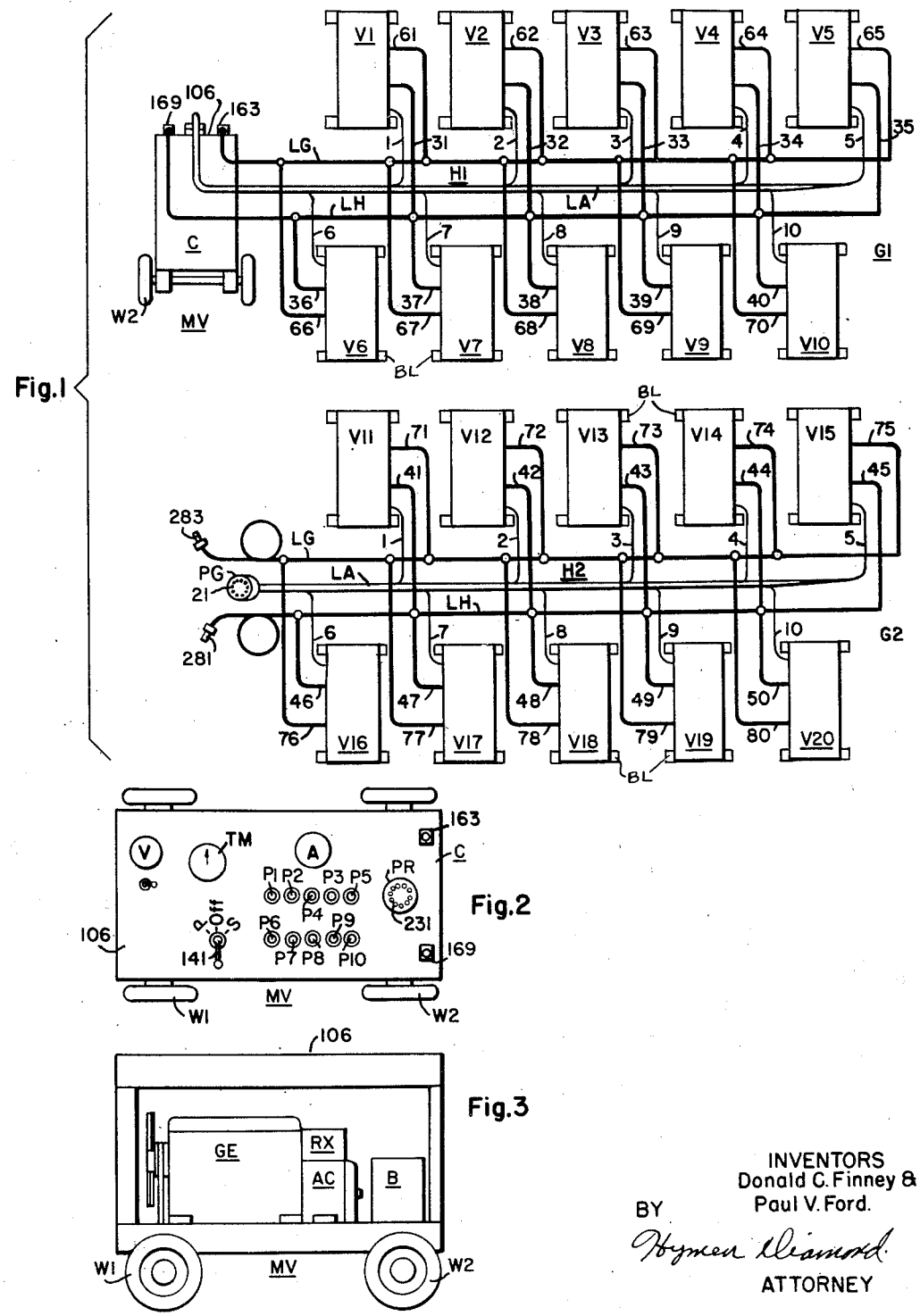
INVENTORS
Donald C. Finney &
Paul V. Ford.
BY Hymen Diamond
ATTORNEY March 19, 1957 D. C. FINNEY ET AL 2,786,168
METHOD AND APPARATUS FOR PRESERVING MOTOR VEHICLES
Filed Feb. 23, 1954 4 Sheets-Sheet 2
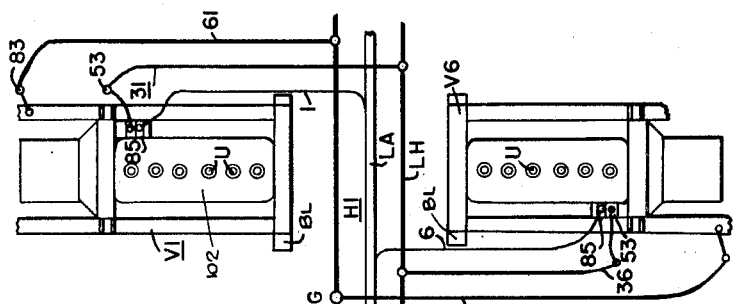
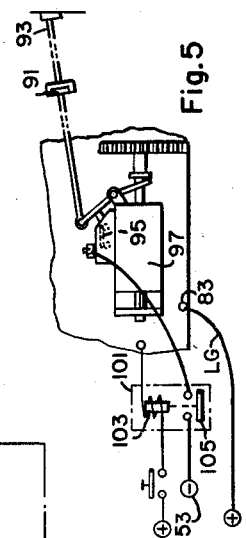
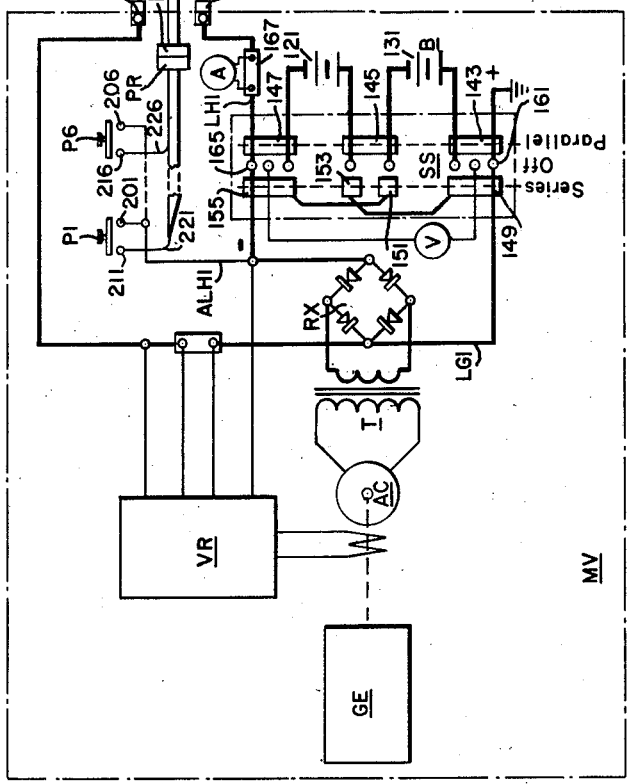
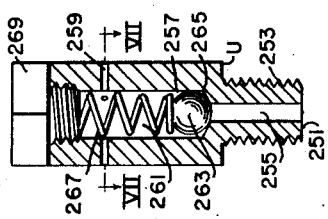
INVENTORS
Donald C. Finney &
Paul V. Ford.
BY
Hymen Diamond
ATTORNEY March 19, 1957 D. C. FINNEY ET AL 2,786,168
METHOD AND APPARATUS FOR PRESERVING MOTOR VEHICLES
Filed Feb. 23, 1954 4 Sheets-Sheet 3
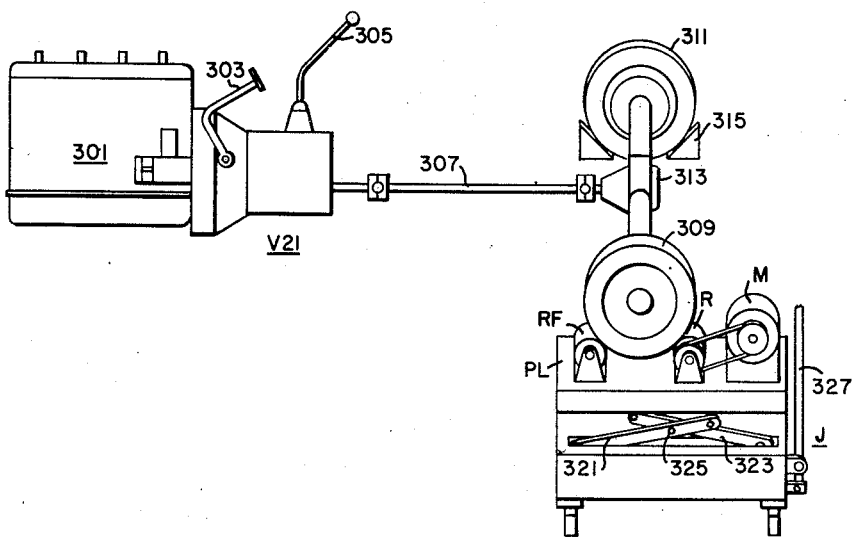
Fig. 8
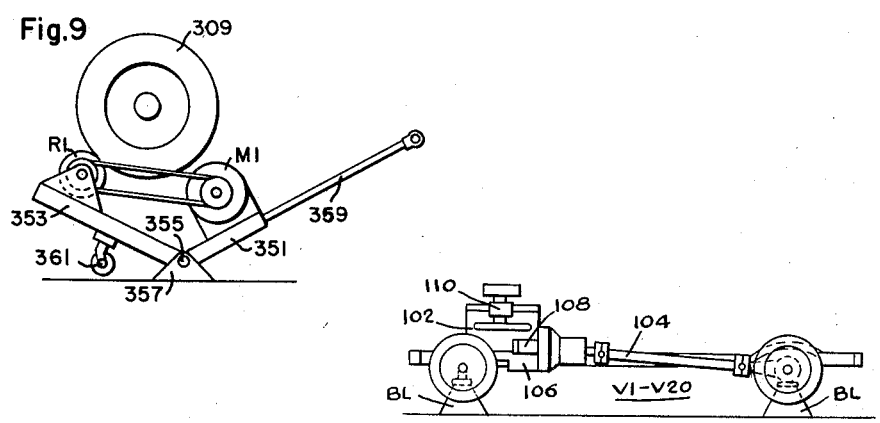
Fig. 9
Fig. 12
INVENTORS
Donald C. Finney &
BY Paul V. Ford.
ATTORNEY

United States Patent Office 2,786,168
Patented Mar. 19, 1957

2,786,168

METHOD AND APPARATUS FOR PRESERVING MOTOR VEHICLES

Donald C. Finney and Paul V. Ford, Glenshaw, Pa., assignors to Fort Pitt Packaging Co., Inc., Pittsburgh, Pa., a company of Pennsylvania Application February 23, 1954, Serial No. 411,874

17 Claims. (Cl. 318—3)

This application is a continuation-in-part of our applications Serial Nos. 366,504 and 366,505, filed July 7, 1953, and our applications Serial Nos. 366,504 and 366,505 are incorporated by reference in this application. Said application Serial No. 366,504 has since become abandoned.

Our invention disclosed in this application relates to power apparatus and methods of operating power supply equipment and has particular relation to apparatus and methods for maintaining stored vehicles, particularly of the automotive type in running or operating condition so that when necessary they become immediately available.

As is known, vehicles in storage unless they are operated, tend to become entirely inoperative particularly by reason of the fact that the various parts, such as the bearings, the pistons and the cylinders and the valve components which, when the vehicles are in use, move in engagement with each other tend to rust or corrode or deteriorate by electrolysis between dissimilar metals in the presence of moisture. The resilient parts also tend to become fatigued. Also the oil and grease seals tend to dry out when the vehicles are returned to service tend to leak. In addition, the anti-friction bearings tend to become deformed at the region of contact with the races from bearing the load in this region for long intervals. Gear teeth are similarly affected.

In accordance with the teachings of the prior art, the practice has been to idle the engine of the vehicles at intervals. In practice, an attendant is usually assigned to the task of idling a group of stored vehicles. This attendant carries a battery and gas supply from vehicle to vehicle, connects the battery to each vehicle in its turn, provides the vehicle with gas and then idles the engine of the vehicle. It has been found that in a vehicle which is idled for only a short time interval, the hydrocarbons of the gas to an extent tend to become converted into water vapor which is condensed on the moving parts if the idling is not carried out for a sufficiently long time interval to heat the engine sufficiently to prevent condensation. Idling for a short time thus tends to accelerate the corrosion of the moving parts and is more deleterious to the vehicles than storage without any operation. For this reason, the attendant who is assigned to the maintenance of the vehicles in storage usually idles each vehicle for a time interval of the order of 1 hour. In view of the large number of vehicles in storage, and the frequency at which the vehicles must be operated, the manpower and gas consumed in this activity is enormous. In addition, the engines of most vehicles are not constructed for extended idling and their life is shortened by this treatment. Because it is impossible to make available the enormous manpower which would be required to idle the engines of all of the vehicles which the military services have in storage only the engines of those vehicles which would serve an immediate strategic purpose are idled. The others are preserved with oils or greases which has proved unsatisfactory.

It is accordingly a broad object of our invention to provide a method and apparatus for preserving automotive vehicles in storage ready for operation.

A more specific object of our invention is to provide a method and apparatus for preserving automotive vehicles in storage lubricated in immediate operating condition.

In accordance with the broad aspects of our invention, each of the stored vehicles which is to be maintained and which, as is the usual practice, is mounted on blocks with its driving wheels disengaged from any running surface and without its battery or gas, is set with its gears in mesh and the engine is turned over at intervals by rotating by mechanical or electrical drives the gears, the crank shaft or the drive shaft. Under such circumstances, the lubricant in the engine is stirred vigorously and lubricates all of the moving parts. In addition, the moving parts, such as bearings, gears and so forth, are moved and do not continuously bear loads in any region for long intervals.

Whether the engine is turned over mechanically or electrically, it is desirable that the load on the engine be reduced to a minimum. This is in part effected by maintaining the driving wheels disengaged from any running surface. In addition, the compression within the cylinders is reduced. This object could in itself be readily accomplished by removing the spark plugs. But the openings in which the spark plugs are secured would in such an event permit moisture to enter the cylinders and corrosion would be accelerated.

It is accordingly a specific object of our invention to provide facilities for reducing the compression in the cylinders of an automotive vehicle without at the same time permitting access of moisture to the vehicle.

In accordance with the broader aspects of our invention, the engine of an automotive vehicle may be turned over electrically by applying to the automatic starting mechanism a voltage equal to the normal, nominal or rated voltage of the battery which is used in such a vehicle. But we have found that such operation of the automatic starting mechanism develops substantial heat in the mechanism and conceivably could damage this device. In view of the purpose of our invention, it is desirable that any possibility of damage be avoided.

It is accordingly a further specific object of our invention to provide an electrical method and apparatus for turning over the engine of an automotive vehicle by actuating the automatic starting mechanism which shall operate without any possibility of damaging this mechanism.

Another specific object of our invention is to provide highly efficient apparatus and a highly efficient method for turning over the engine of an automotive vehicle by actuating the automatic starting mechanism.

Our invention as regards the actuation of the automatic starting mechanism, in its specific aspects, arises from the discovery that when the automatic starting mechanism is actuated from a power source having a voltage substantially higher than the normal or nominal voltage of the battery used in such a vehicle, the operation of the automatic starting mechanism is highly efficient. In fact, our tests conducted on a number of vehicles reveal that the efficiency of the operation of the automatic starting mechanism is increased so that instead of running hot the automatic starting mechanism runs cool when the starting mechanism is supplied from a supply having a voltage approximately twice the nominal voltage of the battery used in the corresponding vehicle.

In accordance with the specific aspects of our invention, we accordingly provide apparatus for turning over the engine of an automotive vehicle by actuating its automatic starting mechanism in which, and a method for so turning over the engine in the practice of which, the voltage supplied to the automatic starting mechanism is at least of the order of twice the nominal voltage of the battery used in the corresponding vehicle.

The novel features which we consider characteristic of our invention are set forth generally above. The invention itself both as to its organization and its method of operation together with additional objects and advantages thereof will be understood from the following description of specific embodiments when read in connection with the accompanying drawings, in which:

Figure 1 is a diagrammatic view showing the general structure and arrangement of apparatus and vehicles in the practice of a preferred embodiment of our invention, Fig. 2 is a view in plan of a maintenance vehicle in accordance with our invention showing the control panel, Fig. 3 is a view in side elevation with one of the walls removed of the vehicle shown in Fig. 2, Fig. 4 is a circuit diagram of the apparatus presented in Fig. 1 shown connected to a pair of automotive vehicles, Fig. 5 is a fragmental view showing the essential features of a modification of our invention applicable to vehicles which do not include a solenoid actuable switching mechanism for actuating the automatic starting mechanism, Fig. 6 is a view in longitudinal section (taken along line VI—VI of Fig. 7) of a plug for spark-plug openings in accordance with our invention, Fig. 7 is a view in transverse section taken along line VII—VII of Fig. 6, Fig. 8 is a diagrammatic view showing a modification of our invention, Fig. 9 is a diagrammatic view showing another modification of our invention, Fig. 10 is a circuit diagram of a power supply which is adaptable for preserving vehicles having batteries of nominal voltage rating varying over a wide range; and Fig. 11 is a fragmental diagram showing a detail of Fig. 4; and Fig. 12 is a diagram showing generally a vehicle of the type preserved in the practice of this invention.

*Description—Figs. 1 through 7*

In Fig. 1 our invention is shown as applied to the maintenance of 20 stored vehicles V1 through V20 subdivided into two groups G1 and G2 of 10 each. It is clear from this view that our invention may be as well applied to any number of vehicles subdivided in the manner shown or in groups of larger or smaller numbers of vehicles. The vehicles V1 through V20 represented in Fig. 1 are of the usual automotive type, such as passenger cars, "jeeps," trucks, aircraft or even tanks. Such vehicles are of the general type shown in Fig. 12 and include an engine 102, moving parts 104 to be driven by the engine, a centralized lubricating system 106 and a starting motor 108. Such vehicles may also include a carburetor 110.

The motor 108 has a supply terminal 112, the motor current flowing between this terminal 112 and ground on the vehicle when terminal 112 is energized. The supply terminal 112 is adapted to be supplied through a switch having a movable contact 114 and fixed contacts 116 and 118, the contact 116 being connected to a terminal 120. The switch 114—116—118 is actuable by a solenoid 122 having a supply terminal 124 and a ground terminal 126. They are mounted on blocks without their batteries and without gas in their gas tanks.

Reduced to its simplest terms our invention includes a harness H1 and H2 respectively for each group G1 and G2 of stored vehicles and a maintenance vehicle MV. Each harness H1 and H2 consists of a hot conductor LH, a ground conductor LG and a cable LA of a set of auxiliary conductors 1 through 10 equal in number to the number of vehicles in each group. The auxiliary conductors terminate in a multiple terminal plug PG of the cannon type to each pin 21 of which one of the auxiliary conductors 1 through 10 is connected.

The hot conductor LH is connected by means of a plurality of branch conductors 31 through 50 to the terminal 53 of each of the vehicles to which the hot terminal of the battery of each vehicle is connected when the vehicle is in normal use. The ground conductor LG is connected by means of a plurality of branch conductors 61 through 80 to a ground connection 83 on each of the vehicles. The ground connection 83 on the vehicle is preferably the connection to which the ground terminal of the battery of the vehicle is connected when the vehicle is in use. The auxiliary conductors 1 through 10 are connected each to the solenoid of the vehicle which actuates the solenoid-actuable normally open switching mechanism in series with the automatic starting mechanism or the self-starter. The solenoid connection is represented by the point 85 on the vehicles but the solenoid and starting mechanism are not shown in detail.

Most vehicles are provided with a solenoid of this type. For automotive vehicles which do not include a solenoid of this type a solenoid may be supplied in accordance with a modification of our invention. This modification is shown in Fig. 5. In vehicles which do not have a solenoid, the automatic starting mechanism is actuated by a starter pedal or button. In practicing our invention with such vehicles, the starter pedal 91 is, as shown in Fig. 5, held closed by a block 93 so that the contact 95 which closes the circuit through the automatic starting mechanism 97 is maintained closed. A separate solenoid switching mechanism 101 is provided. This mechanism 101 includes a coil 103 and a normally open contact or switch 105. The coil 103 is connected to one of the conductors 1 through 10 of the cable LA; and the contact 105 is connected to close the circuit between the hot terminal 53 of the vehicle and the starter 97.

For energizing the harness H1 and H2 the maintenance vehicle MV is provided. The maintenance vehicle MV includes a cabinet or container C mounted on wheels W1 and W2 so that it can be readily moved. The container C has side walls of sheet metal or other suitable material and a desk-like sloping top 106 which constitutes the control panel of the apparatus and carries the control mechanisms. Within the container C are mounted a prime mover which may be a small gas engine GE, an alternating current generator A. C. which may be an alternator such as sold by Leece-Neville, of Cleveland, Ohio, a rectifier RX and a battery B. The alternator is of the general type shown in the Leece-Neville leaflet entitled Alternator Systems, Form No. A–100 and described in Leece-Neville Training Manual Number 6. The gas engine GE is connected to energize the generator A. C., the output of which is connected preferably through a step-down transformer T to the rectifier RX. The output of the rectifier RX supplies the battery B. A suitable voltage regulator VR is interposed between the output conductors of the battery and the field supply of the alternator to maintain the voltage of the alternator constant. The gas engine GE is energized to actuate the alternator A. C. which in turn charges the battery B through the rectifier RX and maintains it continuously in charged condition.

The maintenance vehicle MV may also be an ordinary vehicle on which the alternator A. C., rectifier RX and battery B may be mounted.

In accordance with the preferred practice of our invention, the battery B has a voltage substantially greater than the nominal or rated voltage of the battery used in the vehicles which are being maintained. Specifically, we provide a battery B consisting of two 6 volt units 121 and 131 (Fig. 4) for vehicles of the type requiring a 6 volt battery.

Where the vehicles V1 through V20 have batteries with a normal rating higher than 6 volts or where it is desirable to operate 6 volt vehicles on higher voltages, the supply shown in Fig. 10 may be used. In this case a battery B1 made up of six 6 volt batteries is provided. These batteries may be selectively connected to the harness H1 or H2 through a selector switch SS1. The batteries may be charged as shown with the switch SS1 in the neutral position. The components labelled MV1, LH1, PR1, LG1, correspond to the analogously labelled components of Fig. 1, that is, MVL is a maintenance vehicle, LH1 a hot conductor, PR1 a receptacle and LG1 a ground conductor.

Returning now to Fig. 4, the two batteries 121 and 131 are associated with a tap selector switching mechanism SS which is actuable by a handle 141 on the panel 106 of the maintenance vehicle MV. This switching mechanism SS includes a plurality of contacts 143, 145 and 147 for connecting the batteries 121 and 131 in series so that their output voltage is 12 and a second series of contacts 149, 151, 153 and 155, with contacts 149 and 153 and contacts 151 and 155 respectively connected together, for connecting the batteries 121 and 131 in parallel so that their combined output voltage is six. Depending on the magnitude of the voltage desired the switching mechanism SS may be moved to one position S or the other P.

The battery B includes a ground terminal 161 connected through a ground conductor LG1 to an output ground terminal 163 extending through the cabinet C of the maintenance vehicle MV and a hot terminal 165 connected through a shunt ammeter A and a conductor LH1 to a hot terminal 169 extending through the cabinet C. The hot terminal 165 is also connected through a conductor ALH1 to one of the fixed contacts 201, 206 (only two of the ten shown) of each of a plurality of push button switches P1, P2, P3, P4, P5, P6, P7, P8, P9, P10 corresponding in number to the number of vehicles V1 through V10 or V11 through V20 in each group. The push buttons P1 through P10 are mounted to be actuated from the panel 106. Each of the push buttons P1 through P10 is provided with a second fixed terminal 211, 216 (only two of ten shown) which is connected through conductors 221 and 226 (only two of ten shown) to a receptacle PR extending through the panel of the maintenance vehicle. The receptacle PR has grooves or sockets 231 adapted to receive the pins 21 of plug PG to which the auxiliary conductors 1 through 10 of the harness H1 or H2 are connected.

All of the pins 21 of the plug PG and the sockets 231 of the receptacle are spaced an equal distance circumferentially except one. This pin or socket is nearer to the adjacent pin or socket on one side and displaced further from the adjacent pin or socket on the other side. The plug PG can thus be inserted in the receptacle PR in only one position. The arrangement of the pins 21 and sockets 231 is such that the conductors 221 and 1, 222 and 2, 223 and 3, 224 and 4, 225 and 5, 226 and 6, 227 and 7, 228 and 8, 229 and 9, and 230 and 10 are connected together when the plug PG is in the receptacle PR. Since the conductors 1 through 10 are connected to the vehicles V1 through V10 or V11 through V20 in a certain order an operator at the panel, when he depresses the button P1 through P10, knows to which vehicle it corresponds.

The maintenance vehicle also includes a voltmeter V for indicating the charged condition of the battery B, a timing mechanism TM which may be a self-winding clock of the type used in automotive vehicle and which is energized from the battery or it may include an electric clock driven by the alternator A. C. In either event, the dial of the timer TM is disposed in the panel 106 of the maintenance vehicle MV.

Since the vehicles V1 through V20 when stored are mounted on blocks BL with their driving wheels (not shown) disengaged from any surface, the load on their engines when they are turned over is reduced. This load is further reduced by maintaining the compression in the cylinders low when the engine is turned over. For this purpose, the spark plugs are removed from each of the vehicles V1 through V20 and each spark plug opening is provided with a plug U (Figs. 6 and 7) which comprises a hollow elongated block having a threaded stem 251. The thread 253 in the stem 251 is capable of engaging the thread in a spark plug opening of the vehicle. Plug U may thus be screwed into the spark plug opening in the same manner as a spark plug. The stem 251 is provided with a hollow opening 255 which affords communication between a cylinder of the engine of a vehicle and the opening 257 within the plug. The plug is also provided with a plurality of transverse holes 259 through which the hollow space 257 communicates with the outside air.

The space 227 within the plug is bounded by cylindrical walls 261 and a ball 263 is disposed at the bottom of this space so that it closes the opening in the stem 251 where it connects to the space 257. To render the ball effective the boundary 265 of the space adjacent the opening may be suitably tapered. The ball 263 is urged into engagement with the tapered boundary by a spring 267 which is compressed against the ball by a cap 269 screwed into the top of the plug U.

*Standby—Figs. 1 through 7*

In the standby condition of the apparatus shown in Figs. 1 through 7, the maintenance vehicle MV is disposed in the warehouse, yard or other area where the vehicles V1 through V20 are stored. The prime mover GE is operated to the extent necessary to maintain the battery B charged, the meter V indicating the extent of the charge.

The vehicles V1 through V20 are mounted on blocks with their wheels disengaged from the floor, with their gears meshed preferably in low gear and with plugs U inserted in the spark plug openings of each of the vehicles. Since the vehicles V1 through V20 are in quiescent condition, the ball 263 of each plug U closes the stem opening 255 tightly and prevents the access of moisture to the parts within the corresponding vehicle cylinders. The harness H1 and H2 is connected to the vehicles V1 through V10 and V11 through V20, as shown in Figs. 1, 4 and 5. The hot conductor LH, the ground conductor LG and the cable LA are on the floor or ground of the warehouse or yard with the plug PG and the plugs 281 and 283 of the hot and ground conductors LH and LG ready for insertion in the receptacles of the maintenance vehicle MV.

*Operation—Figs. 1 through 7*

In using the apparatus shown in Figs. 1 through 7, the maintenance vehicle MV is moved into a position adjacent the end of the harness H1 of a group G1 of vehicles V1 through V10, the operating mechanisms of which are to be turned over. The hot conductor LH of the harness H1 is then connected through the receptacle 169 of the maintenance vehicle MV to the hot terminal 165 of the battery B. The ground conductor LG of the harness H1 is correspondingly connected to the ground terminal 161 of the battery. The plug PG to which the auxiliary conductors 1 through 10 are connected is inserted in the receptacle PR of the maintenance vehicle MV. The switch SS is then set in a position in which the battery delivers a voltage substantially higher than the nominal voltage of the batteries of the vehicles. Preferably also the engine GE is operated.

Each of the buttons P1 through P10 is then in its turn closed for a predetermined time interval of the order of 10 seconds and a reading is taken on the ammeter A.

When a push button P1 through P10 corresponding to a vehicle V1 through V10 is closed, the solenoid for this vehicle is actuated in turn actuating the starting mechanism. Since the vehicles are maintained in gear, the operating mechanism of the vehicle is turned over by the actuation of a push button, for the time interval set by the operator by means of the timer. While the mechanism of a vehicle is being so turned over, the lubricant in the vehicle is churned and washes the surfaces of the moving parts, thus keeping them lubricated. All the other parts of the vehicle including its generator, water pump, fuel pump and so forth are also moved. When the engine is turned over, the compression within the cylinders is also increased, the force of the springs 267 in the plugs U is counteracted, the ball 263 is moved away from the opening 255 and the compressed gas within the cylinders is permitted to flow through the opening 255 in the stem 251 and through the openings 257 and 259 in the block to the outside air. The compression on the engines of the vehicles V1 through V10 may thus be relieved.

It is to be noted that while the engine is being turned over in accordance with our invention, each cylinder will suck in the fluid medium in the carburetor on the intake stroke when its valve is open. For preserving the cylinder head and intake and exhaust systems, a preservative medium such as a preservative oil, Vapor Corrosion Inhibitor Crystals (sold by Shell Oil Co. and Nox-rust Co.) or activated silica gel may be provided in the carburetor or air cleaner. On the intake stroke the vapors from the preservative medium are sucked in by the cylinder and coat the system.

The current reading on meter A should be of a certain magnitude for each vehicle V1 through V10. If it is either substantially lower or higher than this magnitude, the reading indicates that the vehicle is in one way or another defective. In the practice of our invention, the operator in turning over the engines of a group of vehicles records the current drawn by the automatic starting mechanisms for the vehicles on a table opposite identification of the vehicle. This data may be studied later to determine the condition of the vehicles.

When the engines of group G1 have been turned over, the operator disconnects the vehicle MV from harness H1 and moves the vehicle MV to group G2 where he connects harness H2 to the vehicle MV. He then performs the same operation on group G2 as on group G1. In the same way any number of groups may be serviced.

We have found that the automatic starters may in accordance with our invention be actuated from a power supply having a voltage of the order or equal to the nominal voltage of the battery for each of the vehicles. But we prefer that in practicing our invention the voltage supplied to the automatic starting mechanisms be approximately twice the nominal battery voltage for the vehicles. Operation at twice the voltage materially increases the efficiency at which the automatic starting mechanism is actuated and the cooling of the mechanism and thus prevents any damage to the starting mechanism. It has been our actual observation in turning over the operating mechanisms of a large number of vehicles, each for substantial time intervals, that the starters become hot while being turned over at the lower voltage and remain cool while being turned over at the higher voltage, one vehicle was operated at the higher voltage for 45 minutes without perceptible increase in temperature. This alone demonstrates the advantage of the higher voltage.

It is not our intention to be bound by any theory or explanation as to the advantages of our invention but these advantages seem to be partly in the improved cooling produced at the higher speed and partly in the increased efficiency.

Thus in accordance with our invention the operating mechanisms of a plurality of vehicles in storage which are maintained on blocks with their driving wheels free and in gear may be turned over and the operating mechanisms lubricated. In the practice of our invention, the operator moves the maintenance vehicle MV from one group of stored vehicles to the other, connects the maintenance vehicle to the harness as described above, and turns over the operating mechanisms of each of the vehicles in its turn for the time interval of 10 seconds, noting the current drawn by the starter. Not only are the vehicles maintained lubricated by this process but the operation of the starters is also observed and if any deficiency is manifested necessary correcting measures may be taken.

*General comments on Figs. 1 through 7*

In the specific practice of our invention, the hot conductor LH and the ground conductor LG are connected respectively to the same hot terminal 53 and to the same ground terminal 83 of each of the vehicles to which their batteries are connected when the vehicles are in normal use. Power is thus also provided for the other components of the vehicles, such as their lights and to any automatic mechanisms which the vehicles may have, such as automatic brake mechanisms, automatic steering mechanism or even bomb bays and radar and communication sets. If a thorough inspection of each of the vehicles is desirable, such a thorough inspection can be carried out at the time that the operating mechanism is turned over. To accomplish this object, the contacts which control the lights and other components of the vehicles may be closed and the current drawn by each component observed. This may necessarily require more than one operator and in practicing this aspect of our invention the power supply must be reset to nominal voltage.

Another aspect of our invention involves the preservation for immediate use of combat vehicles such as tanks which have a large number of highly complex interrelated operating parts. In this case a harness is provided for each vehicle and includes conductors connected to the various components of the vehicle. The maintenance vehicle in this case is also specially adapted for preserving the combat vehicle. This maintenance vehicle is adapted to be connected to the harness and is provided with switches for selectively operating the mechanisms of the vehicle such as the hydraulic pump, the turret mechanisms, recoil mechanisms, radar and communicating sets, etc.

While in accordance with the specific aspects of our invention the hot conductor LH and the ground conductor LG are connected as just specified to the hot battery terminal 53 and the ground battery terminal 83, such connection is not necessary in accordance with the broader aspects of our invention.

*Figs. 8 and 9*

In Figs. 8 and 9 mechanical mechanisms for turning over the operating mechanism of a vehicle in storage are shown. In Fig. 8, a portion of a vehicle V21 in storage is shown for illustrative purposes. This portion includes the engine block 301, the clutch 303, the gear shift lever 305, the drive shaft 307 and the driving wheels 309 and 311 which are in communication with each other through a differential 313. This vehicle is mounted on blocks (not shown) with the driving wheels 309 and 311 free to rotate. But only one of these wheels 309 is permitted to rotate. The other is blocked against rotation by a pair of wedges 315 engaging its periphery.

The apparatus for turning over the operating mechanism in accordance with the modification of our invention shown in Fig. 8 includes a platform PL which is movable by means of a jack J of the usual structure, not shown in detail. This jack J includes sets of scissorlike arms or crossed bars 321 and 323 which are movable about a pivot 325 by means of an operating handle 327 to raise or lower the platform PL secured to the scissor arms. The platform PL carries a motor M which drives a roller R. In addition, the platform carries a free running roller RF.

In the practice of our invention, when the engine of a vehicle is to be turned over, the jack J and its associated apparatus is mounted below the free running wheel 309 and the platform PL is raised so that the rollers R and RF are in engagement with the wheel. With the vehicle in gear the motor may then be energized to rotate the driven roller R which, in turn, rotates the wheel 309. Since the driving wheel 311 coupled to the free running wheel through the differential 313 is blocked against rotation, the rotation of the free running wheel 309 causes the operating mechanism of the vehicle to turn over.

The apparatus shown in Fig. 9 includes a support consisting of a pair of frames 351 and 353 at an angle to each other. These frames are mounted pivotally about a pin 355 which is secured in a block 357 of triangular section adapted to be disposed on the floor and may be pivoted by a handle 359 secured to the frame 351. The other frame 353 has extending from its base a pair of rollers 361 by means of which the support can be moved from place to place.

The supporting frame 351 has mounted thereon a motor M1 and the other 353 a rotatable roller R1 coupled to be driven by the motor M1.

The apparatus is adapted to be used with a vehicle mounted, as shown in Fig. 8. When it is in use, the gear shift lever of the vehicle is set in gear and the assembly shown in Fig. 9 is moved so that the roller R1 and the motor M1 are under the free running driving wheel 309 of the vehicle. The frame 351 which carries the motor M1 is then pivoted in a clockwise direction by the handle 359 extending from this frame so that the roller R1 engages the wheel. The motor is then energized rotating the wheel and through the wheel turning over the operating mechanism of the vehicle.

While we have shown and described certain specific aspects of our invention, many modifications thereof are possible. Our invention, therefore, is not to be restricted except insofar as is necessitated by the spirit of the prior art.

We claim as our invention:

1. The method of preserving one or more automotive vehicles, each having electrically operated starting means so that each vehicle is available for use within a short time after the demand for it arises, each said automotive vehicle being stored without fuel or battery but with a lubricant, said method comprising mounting said vehicle with the driving wheels thereof disengaged from the ground or other operating surface, setting said vehicle in gear, and turning over the operating mechanism of said vehicle at intervals at so high a speed that lubricant is stirred and substantially all moving parts are lubricated, said turning over also causing the weight of the heavy parts of the engine to be supported by different areas of the bearings and other weight supporting parts on which the movable components rest, said turning over being carried out by energizing the associated starting means from an external electric power supply source.

2. The method as claimed in claim 1 wherein the starting means are energized by an external electric supply source having a voltage substantially higher than the voltage of the battery in said or each said vehicle when in use whereby the speed of turning over of the mechanism is high.

3. The method as claimed in claim 1 wherein the starting means is energized by an external electric power supply source having a voltage at least two times the nominal voltage of the battery in said or each said vehicle when in use.

4. The method as claimed in claim 1 of preserving one or more vehicles each having an engine with spark plug openings wherein the speed at which the operating mechanism is turned over is increased and the lubricating of the mechanism is facilitated by reducing the compression of the engine of said or each said automotive vehicle by permitting escape through the spark plug openings of the engine thereof, of any gas compressed by the movement of the pistons thereof produced by the turning over of the engine.

5. The method as claimed in claim 1 of preserving one or more vehicles each having a carburetor wherein a preservative medium is disposed in the region of the carburetor of said or each said vehicle and is sucked into the cylinder head when the operating mechanism of said or each said vehicle is being turned over.

6. Apparatus for preserving in operating condition a plurality of stored vehicles, each vehicle having a ground connection and a hot connection and each vehicle having automatic starting means and solenoid-actuable normally-open switching means in circuit with said starting means, the solenoid of said switching means having a first terminal connected to said ground connection and a second terminal, and said starting means being energized when said switching means is actuated, said vehicles being stored without gas or battery, the said apparatus comprising in combination, power supply means having a ground terminal and a hot terminal; a normally open switch means, adapted to be closed at the will of an operator, corresponding to each said vehicle; a harness including a ground conductor, a hot conductor and a set of auxiliary conductors, each of said auxiliary conductors corresponding to one of said vehicles; means connected to said hot conductor for connecting said hot conductor to said hot terminal; means connected to said ground conductor for connecting said ground conductor to said ground terminal; means including the associated operator-actuable switch means connecting each auxiliary conductor to said hot terminal; means for connecting said ground conductor to the ground connection of each vehicle; and means for connecting said hot conductor to the hot connection of each vehicle; each auxiliary conductor being connected to the second terminal of the solenoid of the corresponding vehicle, whereby when the normally open switch means corresponding to a vehicle is closed the starting means of said last-named vehicle is energized and its engine is turned over.

7. Apparatus for maintaining lubricated in operating condition a plurality of stored vehicles each vehicle having a ground connection and each vehicle having automatic starting means and solenoid-actuable normally-open switching means in circuit with said starting means, the solenoid of said switching means having a first terminal connected to said ground connection and a second terminal, said vehicles being stored without gas or battery, the said apparatus comprising in combination; power supply means having a ground terminal and a hot terminal; a normally open switch means, adapted to be closed at the will of an operator, corresponding to each said vehicle, a harness including a ground conductor, a hot conductor and a set of auxiliary conductors, each of said auxiliary conductors corresponding to one of said vehicles; means connected to said hot conductor for connecting said hot conductor to said hot terminal; means connected to said ground conductor for connecting said ground conductor to said ground terminal; means including the associated operator-actuable switch means connecting each auxiliary conductor to said hot terminal; means for connecting said ground conductor to the ground connection of each vehicle; and means for connecting said hot conductor in circuit with the starting means and the solenoid actuable switch means of each vehicle to energize said last-named starting means when said last-named solenoid actuable switching means is actuated; each said auxiliary conductor being connected to the second terminal of said solenoid of the corresponding vehicle, whereby when a normally-open switch means corresponding to a vehicle is closed the starting means of said last-named vehicle is energized and its engine is turned over.

8. The apparatus of claim 7 wherein the power supply means is of the type capable of delivering a voltage substantially higher than the rated voltage of the battery of each vehicle.

9. The apparatus of claim 7 wherein the power supply includes an alternating current generator, rectifier means and a storage battery, and also including means for connecting said generator to said rectifier means, so that said rectifier means rectifies the output of said generator, and further including means connecting said rectifier means to said battery to maintain said battery charged.

10. The apparatus of claim 9 wherein the means connecting the generator to the rectifier means includes regulator means for regulating the voltage delivered by said generator to said rectifier means.

11. The apparatus of claim 7 for preserving vehicles each of which has spark plug openings in which there are spark plugs during normal use, the said apparatus including means cooperative with the spark plug openings on each vehicle for reducing the compression of said vehicle while its engine is being turned over and for preventing access of moisture to the engine parts through the spark plug openings when said vehicle is quiescent.

12. The apparatus of claim 7 including indicating means and means for connecting said indicating means to the starting means of each vehicle to measure the current through said last-named starting means when the corresponding engine is being turned over.

13. The apparatus of claim 12 wherein the indicating means is an ammeter, the said apparatus including means for connecting said ammeter between the hot terminal of the power supply means and the hot conductor of the harness.

14. An electrically operated apparatus for the preservation of numbers of vehicles subdivided into groups of vehicles, each of said vehicles having an engine, moving parts to be driven by said engine when said engine is coupled to said moving parts in driving relationship therewith, a centralized lubricating system for lubricating said engine and said parts, a starting motor connected to said engine when energized turning said engine over, normally open switch means associated with said motor and electrically actuable means connected to said switch means and when energized closing said switch means, said engine being maintained coupled to said moving parts; the said apparatus comprising in combination a pair of power supply buses associated with each of said groups of vehicles; means including said switch means for connecting said buses respectively to the motors of each of said vehicles through said switch means whereby when the buses are energized and a switch means is closed, the associated motor may be energized from said buses; a control mechanism located at a position remote from the vehicles of a group and including power supply means adapted to be connected to the buses associated with said group, and electrical connecting means adapted to be set selectively in settings each corresponding to a vehicle of a group; and means connecting said connecting means to said electrically actuable means and said buses, so that when said buses are energized and said connecting means is in one of said settings, the corresponding actuable means is energized from said buses closing its associated switch means and energizing the associated motor, whereby the engine and the moving parts of the associated vehicle are turned over, the lubricant is stirred, said last-named engine and moving parts are lubricated and the regions of engagement of the bearing parts of said last-named vehicle are changed, said means for connecting said connecting means connecting each electrically actuable means independently of the others so that each of said motors may be energized independently of the others.

15. The method of preserving numbers of automotive vehicles ready for operation, with apparatus including a plurality of sets of power supply buses, each vehicle having propelling wheels, an engine, moving parts including said wheels to be driven by said engine when said engine is coupled to said moving parts in driving relationship therewith, a centralized lubricating system for lubricating said engine and said moving parts, a starting motor connected to said engine when energized turning said engine over, normally open switch means associated with said motor electrically actuable means connected to said switch means and when energized actuable to close said switch means; the said method comprising dividing said vehicles into groups, each group having a set of said power supply buses associated therewith, mounting each vehicle of a group on blocks with its propelling wheels free to move out of engagement with ground, setting the engine of each of said last-named vehicles coupled in driving engagement with the moving parts of each of said last-named vehicles, connecting the starting motor of each of said last-named vehicles in energy supply relationship with said buses through said switch means, whereby when said buses are energized and a switch means is closed the associated motor is energized from said buses, energizing said buses, and at intervals selectively connecting the actuable means of each of said last-named vehicles in its turn in energy supply relationship with said buses for a predetermined interval of time whereby during said interval the associated switch means is closed and the associated motor is energized by current supplied by said buses and the engine and the moving parts of the associated vehicle are turned over, the lubricant is stirred, the last-named engine and moving parts are lubricated and the regions of engagement of the bearing parts of said last-named vehicle are changed.

16. An electrically operated apparatus for the preservation of numbers of vehicles subdivided into groups of vehicles, each of said vehicles having an engine, moving parts to be driven by said engine when said engine is coupled to said moving parts in driving relationship therewith, a centralized lubricating system for lubricating said engine and said parts, a starting motor connected to said engine when energized turning said engine over, normally open switch means associated with said motor and electrically actuable means connected to said switch means and when energized closing said switch means, said engine being maintained coupled to said moving parts; the said apparatus comprising in combination a pair of power supply buses associated with each of said groups of vehicles; means including said switch means for connecting said buses respectively to the motors of each of said vehicles through said switch means whereby when the buses are energized and a switch means is closed, the associated motor may be energized from said buses; a control mechanism located at a position remote from the vehicles of a group and including power supply means adapted to be connected to the buses associated with said group, electrical connecting means adapted to be set selectively in settings each corresponding to a vehicle of a group, and current indicating means; means connecting said connecting means to said electrically actuable means and said buses, so that when said buses are energized and said connecting means is in one of said settings, the corresponding actuable means is energized from said buses closing its associated switch means and energizing the associated motor, whereby the engine and the moving parts of the associated vehicle are turned over, the lubricant is stirred, said last-named engine and moving parts are lubricated and the regions of engagement of the bearing parts of said last-named vehicle are changed, said means for connecting said connecting means connecting each electrically actuable means independently of the others so that each of said motors may be energized independently of the others; and means for connecting said current indicating means to said buses and said motors of the last-named vehicles so that said indicating means indicates the current flowing through each of said motors with the connecting means in the setting respectively associated with each of said last-named motors.

17. The method of preserving numbers of automotive vehicles ready for operation, with apparatus including a plurality of sets of power supply buses, each vehicle having propelling wheels, an engine, moving parts including said wheels to be driven by said engine when said engine is coupled to said moving parts in driving relationship therewith, a centralized lubricating system for lubricating said engine and said moving parts, a starting motor connected to said engine when energized turning said engine over, normally open switch means associated with said motor and electrically actuable means connected to said switch means and when energized actuable to close said switch means; the said method comprising dividing said vehicles into groups, each group having a set of said power supply buses associated therewith, mounting each vehicle of a group on blocks with its propelling wheels free to move out of engagement with ground, setting the engine of each of said last-named vehicles coupled in driving engagement with the moving parts of each of said last-named vehicles, connecting the starting motor of each of said last-named vehicles in energy supply relationship with said buses through said switch means, whereby when said buses are energized and a switch means is closed the associated motor is energized from said buses, energizing said buses, at intervals selectively connecting the actuable means of each of said last-named vehicles in its turn in energy supply relationship with said buses for a predetermined interval of time whereby during said interval the associated switch means is closed and the associated motor is energized by current supplied by said buses and the engine and the moving parts of the associated vehicle are turned over, the lubricant is stirred, the last-named engine and moving parts are lubricated and the regions of engagement of the bearing parts of said last-named vehicle are changed, and measuring the current through each of said motors while it is energized as aforesaid.

References Cited in the file of this patent
UNITED STATES PATENTS

| | | |
|---|---|---|
| 1,486,133 | Elliot et al. | Mar. 11, 1924 |
| 1,494,401 | Aspinwall | May 20, 1924 |
| 1,564,507 | Barker | Dec. 8, 1925 |
| 1,572,423 | Chapman | Feb. 9, 1926 |
| 1,651,310 | Ashby | Nov. 29, 1927 |
| 1,703,669 | Hansen-Ellehammer | Feb. 26, 1929 |
| 1,999,693 | Hill | Apr. 30, 1935 |
| 2,041,479 | O'Brient | May 19, 1936 |
| 2,043,931 | Morgan | June 9, 1936 |
| 2,247,629 | Chiappetti | July 1, 1941 |
| 2,315,049 | Cronstedt | Mar. 30, 1943 |
| 2,335,901 | Ayers, Jr. | Dec. 7, 1943 |
| 2,406,993 | Chandler | Sept. 3, 1946 |
| 2,513,816 | Patterson et al. | July 4, 1950 |
| 2,563,302 | Atkinson et al. | Aug. 7, 1951 |
| 2,588,178 | Thompson | Mar. 4, 1952 |
| 2,636,786 | Greenough | Apr. 28, 1953 |